United States Patent [19]
Hart

[11] Patent Number: 5,927,513
[45] Date of Patent: Jul. 27, 1999

[54] APPARATUS FOR RECOVERING REUSABLE WOOD SHAVINGS FROM ANIMAL STALLS

[76] Inventor: Ronald D. Hart, 23000 10th Pl. SW., Seattle, Wash. 98166

[21] Appl. No.: 08/856,108

[22] Filed: May 14, 1997

[51] Int. Cl.[6] .................................................. B07B 13/05
[52] U.S. Cl. .......................... 209/677; 209/325; 209/341; 209/367; 209/420; 209/421
[58] Field of Search .................................. 209/677, 675, 209/674, 420, 421, 325, 326, 329, 341, 342, 344, 367, 366.5, 393, 394, 395, 404, 405, 408, 409, 412, 413

[56] References Cited

U.S. PATENT DOCUMENTS

| | | |
|---|---|---|
| 1,773,405 | 8/1930 | Overstrom . |
| 2,010,858 | 8/1935 | Hazle, Jr. ................................. 209/326 |
| 2,453,883 | 11/1948 | Wettlaufer ................................. 209/326 |
| 2,828,014 | 3/1958 | Wantling ................................. 209/326 |
| 2,983,381 | 5/1961 | Ball ..................................... 209/329 X |
| 3,123,552 | 3/1964 | Lowry ..................................... 209/326 |
| 3,307,698 | 3/1967 | Haffner ................................. 209/344 X |
| 3,468,418 | 9/1969 | Renner ..................................... 209/315 |
| 3,703,236 | 11/1972 | Spurlin et al. ........................... 209/326 |
| 3,834,534 | 9/1974 | Peterson et al. .......................... 209/326 |
| 4,237,000 | 12/1980 | Read et al. ............................... 209/319 |
| 4,274,953 | 6/1981 | Jackson ................................. 209/326 |
| 4,341,126 | 7/1982 | Thomas ....................................... 74/61 |
| 5,265,730 | 11/1993 | Norris et al. ............................. 209/326 |
| 5,305,891 | 4/1994 | Bielagus ................................. 209/396 |
| 5,794,787 | 8/1998 | Johnston ................................. 209/420 |

*Primary Examiner*—David H. Bollinger
*Attorney, Agent, or Firm*—Alfred J. Mangels

[57] ABSTRACT

A portable shaker frame that is particularly adapted for separating irregularly-shaped wood shavings used in animal stalls as bedding materials from manure contained in the bedding material. The wood shavings are recovered for reuse and the manure is separated therefrom for disposal. The shaker frame is inclined and is suspended on springs carried on a carriage having wheels to permit it to be moved from place to place. The springs permit the shaker frame to vibrate relative to the carriage frame. The shaker frame includes a number of longitudinally extending, substantially parallel steel rods that are spaced from each to enable the irregularly-shaped wood shavings to pass therethrough while the manure slides downwardly along the rods and into a collection container for disposal. A vibratory motor is positioned on an end panel of the shaker frame for imparting vibratory motion to the rods carried by the shaker frame.

22 Claims, 2 Drawing Sheets

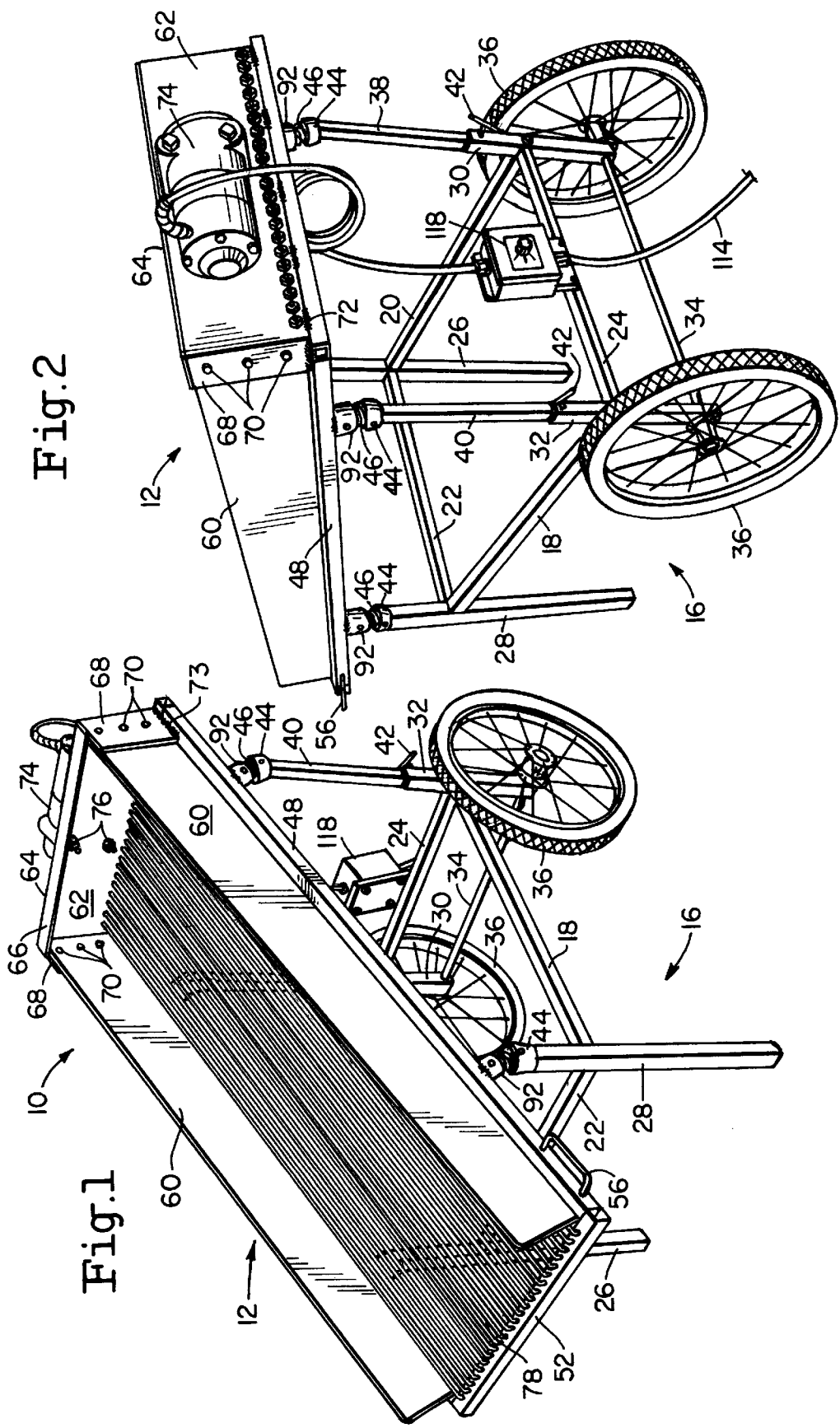

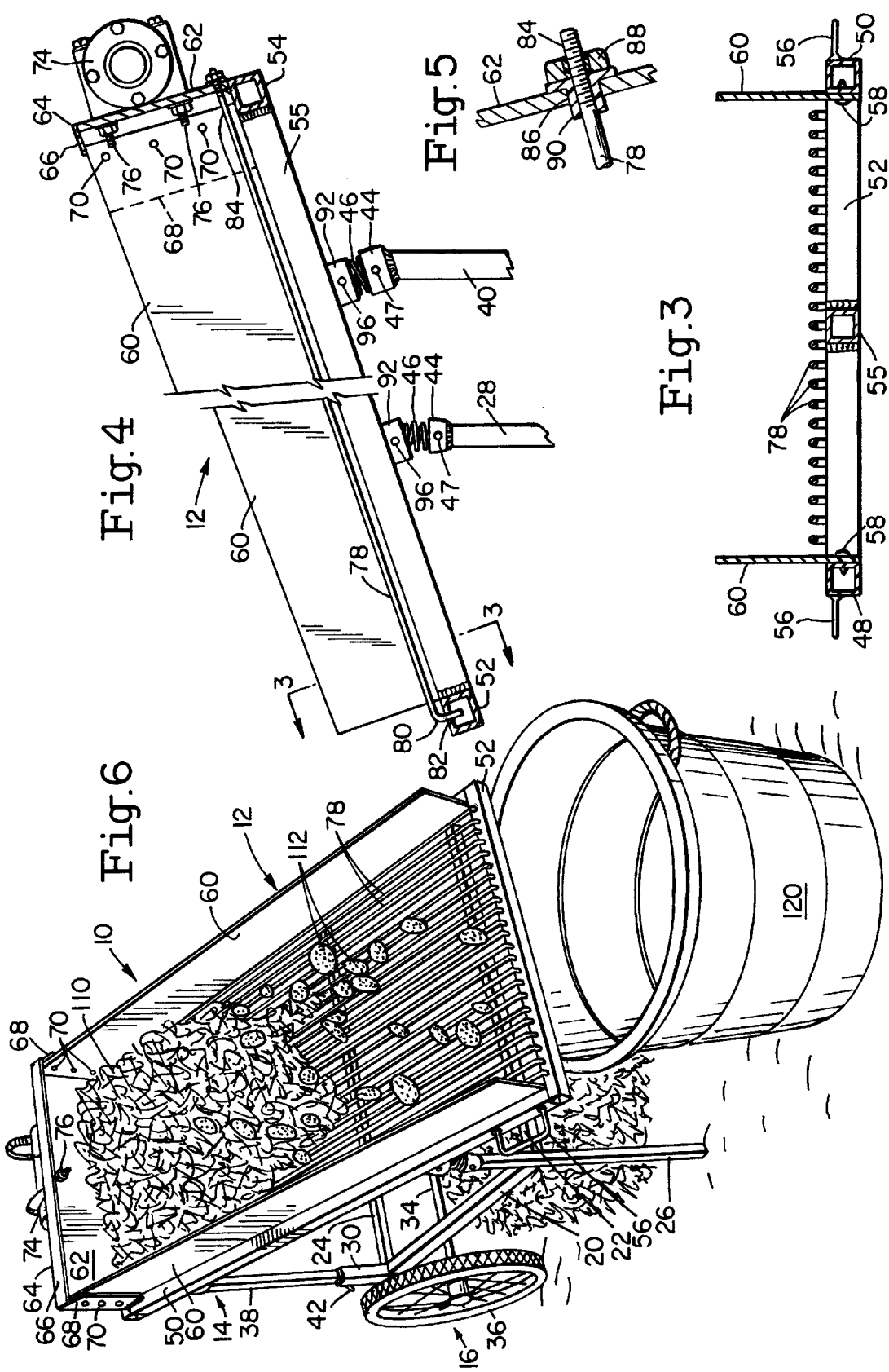

APPARATUS FOR RECOVERING REUSABLE WOOD SHAVINGS FROM ANIMAL STALLS

BACKGROUND OF THE INVENTION

1. Field of the Invention

The present invention relates to separating apparatus for separating wood shavings used as animal stall bedding materials from animal defecation deposited in an on the bedding material. More particularly, the present invention relates to a shaker table apparatus for separating reusable horse stall bedding materials in the form of wood shavings from horse manure, wherein the apparatus is portable and is adapted to be wheeled from horse stall to horse stall and to be used therein.

2. Description of the Related Art

In animal stalls, such as horse stalls, wood shavings, which have a curled form, are often used as bedding materials that are spread over the floor of the stall. Some of the shavings become soiled by animal urine, and horse manure is deposited on the shavings from time to time.

Urine-soaked wood shavings and manure that is concentrated in particular areas of a horse stall are typically manually removed by use of a pitchfork having closely-spaced tines. Because many horses deposit their droppings in a random manner, and do not repeatedly defecate in a single place within the stall, the separation of the droppings from the wood shavings by the use of a pitchfork becomes a cumbersome and a time-consuming task. As a result, a combination of the droppings and some of the wood shavings is frequently removed from the stalls and discarded. However, the combination contains clean wood shavings that could be reused if they were to be separated from the droppings. Such reuse would result in significant operating cost savings for horse owners, and it would promote environmental preservation by minimizing the waste and unnecessary disposal of natural resources.

Accordingly, there is a need for a more efficient way to separate wood shavings used in horse stalls from the horse manure that exists within the stalls. One possible way to separate such materials is by a suitable screening device that would permit only the wood shavings to pass through the screen and back to the floor of the stall, while the manure is separated and collected for disposal.

Separating and screening devices for separating and classifying particulate materials by size are well known. An example of a common structural configuration for such devices is shown in U.S. Pat. No. 1,773,405, entitled, "Vibrating Screen", which issued on Aug. 19, 1930 to G. A. Overstrom. That device is in the form of a vibrating screen box that is supported on spiral springs and that is inclined relative to the horizontal. Vibration of the screen is effected by rotating an unbalanced rotor that is mounted to the screen box above and between the longitudinal ends of the screen box to cause the box and screen to vibrate, whereupon the smaller particles pass through the screen while the larger particles remain on the surface of the screen and can be separately removed.

Another form of separator device, one especially adapted for screening wood chips, is disclosed in U.S. Pat. No. 5,305,891, entitled, "Wood Chip Bar Screen Deck Arrangement", which issued on Apr. 26, 1994, to Joseph B. Bielagus. That device incorporates a plurality of longitudinally extending parallel bars that are mounted in separate, interlaced arrays. The top surfaces of the respective arrays are spaced from each other in two planes, and the arrays are actuated by a drive belt or chain arrangement that causes the bar arrays to move vertically, and relative to each other, to allow wood chips of a predetermined thickness to pass through the arrays while thicker chips are prevented from passing through.

Although vibratory screening devices have been employed for some time, no such devices appear to have been devised that are intended to be used for separating and recovering for reuse highly irregularly shaped materials, such as curled wood shavings of the type that are commonly used as bedding materials in animal stalls, such as horse stalls. In that regard, it is common practice when using a pitchfork to remove an excess of such wood shavings along with the manure. And an attempt to separate the wood shavings from the manure using a pitchfork is a cumbersome and a time-consuming process that is impractical if a significant number of stalls are to be cleaned in that manner because the frequency of defecation by horses requires that horse stalls be cleaned each day.

Generally, because of the difficulty and the time involved, when manure is present in a horse stall a large percentage of clean wood shavings is removed from the stall along with the manure. Those shavings are disposed of along with the manure and are replaced by new wood shavings. However, the disposal of such clean and reusable shavings unnecessarily increases the costs for housing and maintaining animals, and is of particular interest to those who house a number of horses. Consequently, if the manure could be easily separated from the wood shavings a substantial operating cost saving could be experienced over a period of time, particularly where a number of such stalls are involved. The avoidance of the waste of perfectly good and reusable shavings would also be beneficial from an environmental standpoint.

Accordingly, it is an object of the present invention to provide separating apparatus that operates to separate reusable wood shavings from animal manure.

SUMMARY OF THE INVENTION

Briefly stated, in accordance with one aspect of the present invention, separating apparatus in the form of a shaker is provided for separating wood shavings from animal droppings. The apparatus includes a shaker frame that defines a shaker frame opening through which irregularly shaped particles to be recovered, such as wood shavings, are permitted to pass while the animal droppings are blocked from passing through. The frame includes a longitudinal centerline, a pair of spaced, substantially parallel cross frame members that define the ends of the shaker frame, and a pair of spaced, substantially parallel side frame members. A plurality of substantially parallel, chute-defining rods are carried by the shaker frame in the shaker frame opening and extend in a longitudinal direction to define therebetween a plurality of substantially parallel, rectangular openings that extend unobstructed from and between the shaker frame cross members. A vibrator is carried by and is connected with the shaker frame for vibrating the shaker frame at a predetermined vibratory frequency so that the rods vibrate in substantially harmonic motion.

BRIEF DESCRIPTION OF THE DRAWINGS

FIG. 1 is a front perspective view of a shaker apparatus in accordance with the present invention, including a shaker frame that has a shaker bed defined by a plurality of substantially parallel metal rods.

FIG. 2 is a rear perspective view of the shaker apparatus shown in FIG. 1.

FIG. 3 is a transverse, cross-sectional view of the shaker frame shown in FIGS. 1 and 2, taken along the line 3—3 of FIG. 4.

FIG. 4 is a fragmentary side elevational view of the shaker frame, partially in section and partially broken away, taken in a longitudinal direction of the frame.

FIG. 5 is an enlarged, fragmentary, cross-sectional view of a portion of the shaker frame end panel showing the connection between one of the shaker rods and the frame end panel.

FIG. 6 is a front perspective view of the shaker when in use to separate reusable wood shavings from horse manure.

DESCRIPTION OF THE PREFERRED EMBODIMENTS

Referring now to the drawings, and particularly to FIGS. 1 and 2 thereof, there is shown a vibratory separator apparatus 10 in accordance with the present invention. Separator apparatus 10 is in the form of an inclined chute 12 including a shaker frame 14 that is supported on a carriage frame 16.

Carriage frame 16 includes a generally rectangular carriage frame that is formed from a pair of spaced, substantially parallel carriage side members 18, 20, and a pair of spaced, substantially parallel cross members 22, 24 that together with side members 18, 20 define a rectangular lower box frame. A pair of front legs 26, 28 are positioned at one pair of corners of the box frame, at the junctions of a cross member 22 and side members 18 and 20. A pair of rear legs 30 32 are positioned at the opposite cross member 24 at the ends thereof and the intersections of cross member 24 with side members 18 and 20. As shown, the upper ends of rear legs 30 and 32 of carriage frame 16 can be at the same elevation as the upper ends of front legs 26 and 28. At their lower ends, rear legs 30 and 32, which are shorter in length than front legs 26 and 28, each include aligned apertures that rotatably receive an axle 34. A pair of wheels 36 are mounted at respective ends of axle 34 to permit vibratory separator 10, to be conveniently moved from place to place.

Rear legs 30 and 32 of carriage 16 are preferably hollow to receive respective telescoping rear upper leg members 38, 40 that can be extended from and retracted into rear legs 30, 32 to increase or decrease the height of the rear legs of carriage frame 16. Rear upper leg members 38 and 40 can be retained at a desired height by means of T-shaped bolts 42 that are threaded through nuts (not shown) that are welded to carriage rear legs 30 and 32, and that clamp against rear upper leg members 38 and 40, respectively, to position shaker frame 12 at the desired inclination relative to the ground.

As best seen in FIG. 3, the uppermost ends of each of front legs 26 and 28 and the uppermost ends of each of rear upper leg members 38 and 40 carry lower spring sockets 44 that are in the form of cup-shaped members to receive therewithin respective helical coil springs 46. The lower ends of coil springs 46 can be retained within spring sockets 44 by means of cotter pins 47, or the like.

Vibratory separator apparatus 10 includes shaker frame 14 that is carried on and is resiliently supported by rectangular carriage frame 16. Shaker frame 14 includes a pair of spaced, substantially parallel shaker side frame members 48, 50 and a pair of spaced, substantially parallel shaker frame cross members 52, 54. Shaker frame side members 48, 50 and shaker frame cross members 52, 54 are welded together at their respective ends to define a rectangular frame structure. Shaker frame side members 48, 50 and shaker frame cross members 52, 54 can be of any desired cross section, although a tubular, closed, box-beam-like configuration (see FIG. 3) is preferred because it provides the desired frame flexural and torsional rigidity while also saving considerable material and weight as compared with a structure formed from solid frame members.

Also contributing to the rigidity of shaker frame 14 is central, longitudinal support member 55, which extends between and is welded at its ends to each of cross frame members 52 and 54. With respect to the material and size of the members defining shaker frame 14, it has been found that for frame side members 48, 50 one-inch square steel tube having a wall thickness of 0.063 in., and for frame cross members 52, 54 one-inch square steel tubing having a wall thickness of 0.095 in. provide good shaker frame performance. Additionally, at the lowermost ends of each of shaker frame side members 48, 50 a handle 56 is provided for assisting in conveniently moving vibratory separator 10 from place to place, as will hereinafter be explained.

Shaker frame 14 defines a planar, open support structure. Extending substantially perpendicularly from the plane so defined and upwardly from and along each of side members 48, 50, is a side panel 60, that is secured to the inwardly-facing longitudinal surface of a respective side member by means of bolts 58 (see FIG. 3). Side panels 60 serve to prevent lateral movement of the material deposited in vibratory separator apparatus 10 when it is in use, to confine the material to move in a substantially longitudinal direction when it is within the separator. Preferably, each of side panels 60 extends substantially the entire length of the associated side frame member and extends upwardly therefrom several inches, preferably of the order of about six inches or so. Side panels 60 can be made from aluminum alloy sheet having a thickness of 1/8 in. and preferably are spaced from the inwardly-facing side of their respective side frame members 48, 50 by a 1/8 inch rubber gasket. Side panels 60 also help transmit vibrations from a vibratory motor to the entire shaker frame. They also serve as stiffeners to minimize bending of each of frame side members 48 and 50 in a vertical plane.

An end panel 62 extends across the upper end of shaker frame 12 and is oriented perpendicular to each of side panels 60 and also perpendicular to the plane defined by shaker frame 14. End panel 62 is preferably made from sheet steel of about 3/16 in. thickness, is firmly secured along its entire lower longitudinal edge to shaker upper frame cross member 54, preferably by stitch welding, and it extends between the respective side panels 60. Additionally, along its uppermost edge 64 end panel 62 includes a short, right angle bend that defines an upper, perpendicular, integral stiffening flange 66 that extends between side panels 60, substantially parallel to the plane defined by shaker frame 14, and in the direction of shaker lower cross frame member 52 for a distance of about one inch. End panel 62 also includes integral perpendicular extensions 68 at each end that are also defined by bends in panel 62. Extensions 68 are adapted to lie against the upper end portions of and to be firmly connected to respective side panels 60, such as by bolts 70, or the like.

The structure of end panel 62, including integral stiffening flange 66, integral perpendicular extensions 68, and bottom weld 72 (see FIG. 4) and side welds 74 (see FIG. 1), all serve to define end panel edge restraints that operate to provide a flat, rectangular end panel 62 that is restrained along substantially the entirety of each of its marginal edges, similar to the manner in which a drumhead is securely and continuously attached to and supported for vibration by the hollow cylinder that defines the drum frame. Preferably, end panel 62 is a sheet of substantially rigid sheet metal having an area sufficiently large to carry on its rearwardly-facing surface and support a vibratory motor 74 that is bolted to end panel 62 by means of a pair of bolts 76, or the like.

Vibratory motor 74 is preferably a variable speed device that can be adjusted to impart to shaker frame 14 vibratory energy having a desired force level through end panel 62, to cause the frame to vibrate to enable separation of the wood shavings from the manure. Any of a number of vibratory motors can be employed, and an example of a suitable vibratory motor is Model SCR-200, manufactured and sold by Vibco, Inc., of Wyoming, R.I. Preferably, the vibratory motor is positioned centrally on end panel 62 with the motor shaft disposed horizontally so that the eccentric weight within the motor travels in a vertical plane, relative to the vibratory separator apparatus 10. Use tests have revealed that a vibratory centrifugal force of up to 200 lb. (890 newtons) will provide the desired frequency and amplitude of vibrations in the structure described herein.

As best seen in FIGS. 1 and 6, the bed of vibratory separator apparatus 10, onto which the wood shavings and manure to be separated are placed, is defined by a plurality of parallel metallic rods 78 that are preferably of circular cross section. The rods can be made from stainless steel or from mild steel. Additionally, rods 78 preferably have a diameter of ¼ in., and when of that diameter they are positioned 0.80 inch from center to center.

Referring now to FIG. 4, which shows a side cross-sectional view of shaker frame 14, each of rods 78 has a lower end that includes a bent portion 80 that defines a hook to engage cross member 52. Each of the hooked ends of the rods extends into and is received in a respective one of a series of spaced, laterally aligned apertures 82 that are formed in and extend through the upwardly facing surface of frame lower cross member 52. Bent rod end portions 80 are formed by bending the ends of the rods through a bend angle of greater than 90°, preferably about 98°, to form a hook to retain the lower ends of rods 78 in apertures 82 provided in frame cross member 52. By connecting and retaining rods 78 with member 52 in that manner the manure slides freely along the rods and freely and unimpeded off the lower end of shaker frame 12.

Referring now to FIG. 5, the uppermost ends 84 of rods 78 are threaded and extend through apertures 86 provided in end panel 62. Rods 78 are securely held in shaker frame 14 and each rod is placed under tension that is applied by adjusting the torque applied to lock nuts 88 that are threadedly carried at uppermost ends 84 of each of rods 78. Preferably the tension in each of rods 78 is the same. Lock nuts 88 can be nylon-containing stop nuts manufactured by Nylock Fastener Corp., of Macomb, Mich., to prevent self unscrewing of the nuts because of the vibrations induced within the rods 78 when the apparatus 10 is in operation. Additionally, nylon bushings 90 are provided in apertures 86 and surround upper ends 84 of rods 78 to space each rod 78 and also nuts 88 from direct contact with end panel 62, but to impart vibrations from end panel 62 to rods 78, as will be discussed in greater detail hereinafter.

Shaker frame 14 includes along each of side frame members 48 and 50 two longitudinally spaced, cup-shaped upper spring sockets 92 that are carried on the downwardly-facing sides of each of side frame members 48 and 50, as best seen in FIG. 4. Upper spring sockets 92 are positioned relative to each other a distance that corresponds substantially with the spacing between corresponding lower spring sockets 44 on the carriage frame so that upper spring sockets 92 are each in opposed relationship with a corresponding lower spring socket 44. Positioned between the respective opposed upper and lower spring sockets are compression coil springs 46 of helical form that serve to suspend shaker frame 14 from the carriage frame in a resilient manner and allow motion of the shaker frame relative to the carriage frame. Springs 46 can be retained in the respective upper spring sockets by means of cotter pins 96, or the like, that pass through sockets 92 and through springs 46 to constrain the respective spring ends within the sockets.

An alternate structural arrangement for elastically supporting shaker frame 14 on carriage 16 involves the use of differently-configured coil springs that are in the same positions relative to shaker frame 12 and carriage frame 16 as those shown in the drawings. The alternate springs have one or more reduced diameter coils at each end of the spring, through which connecting bolts extend. The bolt heads are positioned within the interior of the springs and the bolt shanks extend axially outwardly from the springs through the reduced diameter spring ends. A flat washer, or the like, having a diameter greater than the diameter of the end coils of the spring is positioned between the bolt head and the inner end of the reduced diameter coils to prevent the bolt head from passing out the end of the spring and to thereby retain it within the interior of the spring. The bolt at one end of the spring is threadedly connected with a side frame member of shaker frame 14, and the bolt at the other end of the spring is threadedly connected with the uppermost end of a carriage leg. Accordingly, the shaker frame suspension can be simplified by eliminating the spring cups shown in the drawings. Another simplification to the resilient suspension of shaker frame 12 from carriage frame 16 can be effected by substituting for the coil springs shown in the drawings resilient elements that are made from rubber, or other resilient materials.

In operation, with the shaker apparatus in a horse stall, and referring to FIG. 6, animal stall bedding material including wood shavings 110 and animal droppings in the form of manure balls 112 are deposited onto the upper end of the inclined shaker frame 14, close to end plate 62 and between side panels 60. Vibratory motor 74 is connected by an electrical conductor 114 with a source of electrical power (not shown), and it started by turning speed control 116, carried in motor control box 118 supported on carriage frame 16. The speed of motor 74 is selected to cause shaker frame 14 and rods 78 to vibrate at a suitable frequency and amplitude so that the wood shavings pass through the shaker bed defined by rods 78, while the manure, which is too large to pass between the rods, slides downwardly along shaker frame 14 to fall into container 120, commonly called a "skip."

The wood shavings 110 and the manure 112 on the shaker bed are caused to vibrate, as a result of the vibratory action imparted by motor 74 to shaker frame 14 and to rods 78. Because of the inclination of the shaker frame, the wood shavings and manure, as they vibrate, tend to move downwardly along rods 78, the speed of downward movement being dependent upon their weight, the angle of inclination of shaker frame 14, the surface finish of rods 78, and the frequency and amplitude of vibration of rods 78.

The irregularly-shaped wood shavings have varying degrees of curl. Some shavings are shaped like a spiral spring that has the centerline of the spring material lying in a single plane; others are shaped like a spiral spring that has had its inner and outer ends pulled outwardly different distances in an axial direction of the spiral. Still other shavings are in the form of curved, miniature wood chips. After being placed on the shaker bed some of the wood shavings pass through the spaces between the rods to fall to the floor of the stall. Other shavings, those too large to pass through the bed, or not oriented properly to pass through, are agitated by the vibrating rods and bounce in an upward direction as they also move downwardly along the rods. That movement pattern is continuously repeated until the orientation of individual wood shavings is such as to enable the shaving to pass between a pair of the vibrating, spaced, side-by-side rods to fall to the floor of the stall beneath carriage 16.

The manure is also agitated by the vibrating rods, as a result of which it also moves downwardly along rods 78 by virtue of the inclination of shaker bed 14. However, because of the normal sizes of the manure particles, and because of the spacing between adjacent rods 78, the manure particles do not pass between the rods but, instead, slide down the entire length of the shaker bed and fall off shaker frame 14 into container 120 for disposal. In that regard, because animal manure is friable, the degree of friability depending upon the moisture content of the manure and the length of time the manure has lain in the bedding material, it is important that the frequency and amplitude of rod vibrations be closely monitored and controlled to avoid excessive vibrations that can cause breakup of the manure into smaller particles, which could have the undesired result that smaller manure particles might pass between the rods to fall to the ground along with the recovered wood shavings.

Preferably, all the rods are caused to vibrate in a substantially vertical plane, although all the rods need not vibrate in phase with each other. When the rods vibrate vertically, the lateral spacing between adjacent rods is maintained, although the gaps between adjacent rods may grow larger and smaller because of the different phase relationships between adjacent vibrating rods. Such gap changes enable some of the larger of the irregularly-shaped wood shavings to pass between adjacent rods, which might not occur if the gaps between the rods remained the same if the rods were to vibrate in phase with each other. Vibratory motor 74 is therefore operated at a speed sufficient to form standing waves in the rods, at either the first harmonic frequency of the rod, having no nodes between the rods ends, or at the second harmonic frequency of the rod, having a single node at the center of the rod, similar to the harmonics of a vibrating string forming part of a musical instrument.

Rod tension is also an important parameter for the effective operation of the present invention. In that regard, the tension in rods 78 can be adjusted by changing the torque to which locknuts 88 are tightened. For ¼ inch cold rolled steel rod having a vibratory length of 43.5 in., the preferred rod tension is achieved when the locknuts are torqued to a torque value of about 12 in.-lb. to about 20 in.-lb. in order to have the rods vibrate in harmonic motion.

The shaker bed itself is inclined to the horizontal at an angle of from about 15° to about 30°, preferably about 16° to about 20°, to allow sufficient residence time of the bedding material on the shaker bed for the wood shavings to fall between the rods, while the larger manure particles slide down the bed, along rods 78, to the collection container for disposal. It will be apparent that the downward speed of movement of manure along the inclined shaker bed is also dependent upon the frictional force between the moving material and the rod surfaces. Rods having the standard surface roughness of commercial cold rolled steel rods have been found to be effective at about a 20° shaker frame inclination. However, when rods having a lower surface coefficient of friction, such as those having a Teflon coating, if desired for convenience in cleaning the rods, the inclina-tion of the shaker bed should be reduced to about 16° in view of the lower frictional resistance provided by the Teflon coating. Additionally, if desired, stainless steel rods can be employed, as can rods made from spring steel or fiberglass.

The vibratory motor (Vibco Model SCR-200, for example) preferably has its axis of rotation extending horizontally across the shaker bed. Additionally, motor 74 is operated at a rotational speed of from about 2300 rpm. to about 2500 rpm., preferably about 2400 rpm., to provide an impact force to shaker frame 14 of up to 120 lb. (534 newtons of centrifugal force). Significantly higher or lower motor speeds result in more violent vibrations of the rods and of the shaker bed, and can cause excessive bouncing and possible breakup of manure particles, which is undesirable. The relationship between the impact force provided by the vibratory motor (which is a function of the eccentric weight within the motor and the motor shaft speed) and the sprung weight of the shaker frame is believed to be of the order of from about 4:1 to about 5.5:1 for the most effective operation of the apparatus.

In an actual device in which a shaker frame made from 1 in. square steel tubing in which the side frame members had a wall thickness of 0.063 in. and the cross frame members had a wall thickness of 0.095 in.; in which the shaker frame had an overall width of 21.125 in., an overall length of 45.5 in., a total of 23 steel rods having a diameter of ¼ in., and had a steel back plate of 3/16 in. thickness and a size of 19.25 in. by 6.0 in.; and in which a vibratory motor having a weight of about 17 lb. was provided, the total sprung weight of the shaker frame was about 39 lb. and an impact force of 120 lb. was found to give excellent results with a frame having the structure herein disclosed and having that weight.

Although particular embodiments of the present invention have been illustrated and described, it will be apparent to those skilled in the art that various changes and modifications could be made without departing from the spirit of the present invention. Accordingly, it is intended to encompass within the appended claims all such changes and modifications that fall within the scope of the present invention.

What is claimed is:

1. Apparatus for separating irregularly shaped particles for reuse, said apparatus comprising:

(a) a shaker frame defining a shaker frame opening through which irregularly shaped particulates are adapted to pass, the frame including a longitudinal centerline, a pair of spaced, substantially parallel cross members defining ends of the shaker frame, and a pair of spaced substantially parallel side members that extend between ends of the respective cross members, wherein the shaker frame includes an end panel mounted at one end of the shaker frame;

(b) a plurality of laterally spaced, substantially parallel, chute-defining rods carried by the shaker frame and extending in the longitudinal direction across the shaker frame opening to define therebetween a plurality of substantially parallel, rectangular openings that extend unobstructed from and between the shaker frame cross members; and (c) a vibrator carried by and connected with the end panel of the shaker frame for imparting a vibratory impact force to the end panel and to the shaker frame so that the rods vibrate in harmonic motion.

2. Apparatus in accordance with claim 1 wherein the shaker frame is defined by a plurality of tubular metallic rods welded together at their ends.

3. Apparatus in accordance with claim 1 wherein the vibrator includes an eccentrically supported weight that is carried on a rotatable shaft, and wherein the shaft has an axis of rotation disposed substantially horizontally.

4. Apparatus in accordance with claim 3 wherein the vibrator is positioned on the end panel so that the eccentrically supported weight is substantially centrally positioned relative to the end panel.

5. Apparatus in accordance with claim 1 wherein the ratio of the vibratory impact force developed by the vibrator and the weight of the shaker frame is from about 2.5 to about 3.5.

6. Apparatus in accordance with claim 1 wherein the rods are steel rods having a diameter of about ¼ inch, and the center-to-center spacing of adjacent rods is about 0.80 in.

7. Apparatus in accordance with claim 6 wherein the rods include an outer coating of Teflon to facilitate movement of material along the rods.

8. Apparatus in accordance with claim 1 wherein the rods are each retained within the shaker frame under tension.

9. Apparatus in accordance with claim 8 including means for adjusting the tension of the rods while the rods are carried in the shaker frame.

10. Apparatus in accordance with claim 8 wherein the tension in each of the rods is substantially the same.

11. Apparatus in accordance with claim 10 wherein the rod tension is from about 12 in.-lb. to about 20 in.-lb.

12. Apparatus in accordance with claim 10 wherein one end of each rod is bent through a bend angle of greater than 90° to form a hook that is received in apertures formed in the shaker frame, and the opposite end of each of the rods is threaded and extends through the end panel, and wherein nuts are threadedly carried on the threaded ends of the rod to bear against the shaker frame end panel for tensioning the rods.

13. Apparatus in accordance with claim 12 wherein the bend angle is about 98°.

14. Apparatus in accordance with claim 12 including a resilient bushing surrounding the rod end that passes through the end panel to space the rod end from the end panel.

15. Apparatus in accordance with claim 14 wherein the support frame includes at least one wheel to facilitate movement of the apparatus from place to place.

16. Apparatus in accordance with claim 15 wherein the inclining means is operable to incline the shaker frame at a angle of from about 15° to about 25° relative to a horizontal plane.

17. Apparatus in accordance with claim 14 including means for inclining the shaker frame relative to a horizontal plane.

18. Apparatus in accordance with claim 14 wherein the shaker frame is supported on the support frame on a plurality of springs to permit vibratory motion of the shaker frame relative to the support frame.

19. Apparatus in accordance with claim 14 wherein the support frame includes two wheels positioned at one end of the shaker frame.

20. Apparatus in accordance with claim 1 wherein the shaker frame is carried on a support frame.

21. Apparatus in accordance with claim 1 wherein the end panel includes stiffening means along each edge thereof.

22. Apparatus in accordance with claim 1, wherein the end panel is a substantially flat sheet of generally rectangular form and includes edge restraints along each of its marginal edges.

* * * * *